United States Patent
Jasim et al.

(10) Patent No.: US 11,942,790 B2
(45) Date of Patent: Mar. 26, 2024

(54) HVDC POWER TRANSMISSION

(71) Applicant: General Electric Technology GmbH, Baden (CH)

(72) Inventors: Omar Jasim, Stafford (GB); Mohomed Abdul Quium, Stafford (GB)

(73) Assignee: General Electric Technology GmbH, Baden (CH)

( * ) Notice: Subject to any disclaimer, the term of this patent is extended or adjusted under 35 U.S.C. 154(b) by 92 days.

(21) Appl. No.: 17/788,244

(22) PCT Filed: Dec. 23, 2020

(86) PCT No.: PCT/EP2020/087772
§ 371 (c)(1),
(2) Date: Jun. 22, 2022

(87) PCT Pub. No.: WO2021/130317
PCT Pub. Date: Jul. 1, 2021

(65) Prior Publication Data
US 2023/0028868 A1 Jan. 26, 2023

(30) Foreign Application Priority Data
Dec. 23, 2019 (EP) ...................... 19275153

(51) Int. Cl.
*H02J 3/36* (2006.01)
*H02J 3/38* (2006.01)
*H02J 3/48* (2006.01)

(52) U.S. Cl.
CPC ...................... *H02J 3/36* (2013.01); *H02J 3/48* (2013.01); *H02J 3/381* (2013.01); *H02J 2300/28* (2020.01); *Y02E 60/60* (2013.01)

(58) Field of Classification Search
CPC .......... H02J 2300/28; H02J 3/36; H02J 3/381; Y02E 10/76; Y02E 60/60
See application file for complete search history.

(56) References Cited

U.S. PATENT DOCUMENTS

2017/0054301 A1* 2/2017 Fintzos ................ H02J 3/381

FOREIGN PATENT DOCUMENTS

CN 106816887 B 6/2017
DE 102017215821 A1 * 3/2019
(Continued)

OTHER PUBLICATIONS

International Search Report and Written Opinion for PCT/EP2020/087772 dated Mar. 23, 2021, 10 pages.
(Continued)

*Primary Examiner* — Ryan Johnson
(74) *Attorney, Agent, or Firm* — Eversheds Sutherland (US) LLP

(57) ABSTRACT

A control apparatus is described for controlling a frequency set-point for a first AC network electrically connected to a first HVDC station to regulate active power. The controller has a frequency controller operable in a first mode of operation to determine a frequency set-point for the first AC network based on a measured DC voltage at the first HVDC station. A disturbance detector is configured to monitor the measured value of DC voltage at the first HVDC station for a predetermined characteristic indicative that a variation in measured DC voltage does correspond to a known modulation applied to the DC voltage by a second HVDC station. The frequency controller is configured to determine the frequency set-point for the first AC network based on a measured value of DC voltage if said predetermined characteristic is detected, and to control the frequency set-point to a predetermined default frequency if not detected.

14 Claims, 6 Drawing Sheets

(56) References Cited

FOREIGN PATENT DOCUMENTS

| | | |
|---|---|---|
| EP | 2 940 824 A1 | 11/2015 |
| EP | 2940824 A1 | 11/2015 |

OTHER PUBLICATIONS

Silva, B. & al.: "Control Strategies for AC Fault Ride Through in Multiterminal HVDC Grids", IEEE Transactions on Power Delivery, 29 (1), 395-405, Apr. 15, 2014.

Silva, B., et al., "Control Strategies for AC Fault Ride Through in Multiterminal HVDC Grids", IEEE Transactions on Power Delivery, vol. 29, No. 1, Feb. 2014 (11 pp.).

\* cited by examiner

HVDC POWER TRANSMISSION

CROSS-REFERENCE TO RELATED APPLICATIONS

This application is a U.S. National Stage Application under 35 U.S.C. 371 and claims the priority benefit of International Application No. PCT/EP2020/087772, filed Dec. 23, 2020, which claims priority to European Application No. 19275153.5, filed Dec. 23, 2019, both of which are incorporated herein by reference.

This disclosure relates to methods and apparatus for HVDC (high voltage direct current) power transmission, and in particular to frequency control for an AC power generating system connected to an HVDC converter station.

High voltage direct current (HVDC) power transmission has been proposed for a number of different applications. HVDC is particularly useful for power transmission over long distances, in particular for transmission over relatively long distances across bodies of water, where the use of overhead lines is not practical and a submarine cable is necessary, as the use of long cables can be problematic for alternating current (AC) power distribution. HVDC is also useful for interconnecting alternating current (AC) networks that operate at different frequencies. HVDC power transmission has thus been proposed for transmitting power from power generating systems, such as wind power parks, that are relatively remote from the main AC grid and in particular for transmitting power from offshore wind power parks.

For HVDC power transmission, a first HVCD station may be operable to transmit electrical energy to a second HVDC station over a DC transmission line, e.g. an overhead line or subsea or buried cable. The first HVDC station may generate the DC supply by conversion from a received AC input supply, e.g. from an AC power generation system such as a wind power park. The second HVDC station then typically provides conversion back from DC to AC for supply to a connected AC network, e.g. an AC electrical distribution grid. Each of the first and second HVDC stations may therefore typically comprise a suitable converter, such as a voltage source converter (VSC), for converting from AC to DC or vice versa.

In use each HVDC station will operate in accordance with the relevant grid codes for the AC grid to which it is connected. In particular, where the second HVDC station is connected to an onshore AC distribution grid, the HVDC power transmission should be operated to regulate power flow to the AC grid in accordance with operating conditions. If the frequency of the AC grid connected to the onshore HVDC station increases it may be desirable to reduce the active power infeed.

A controller of the second HVDC station may thus monitor the conditions of the AC grid to which it is connected, in particular the AC frequency, and, when necessary, take steps to reduce the active power infeed. The controller of the second HVDC station will generally be arranged to communicate with a controller of the first HVDC station so as to reduce the infeed of active power from the AC generation system.

In at least some instances, the first HVDC station may not be implemented with direct control of power infeed from the AC generation system. For instance, in the example of the AC power generation system being a wind power park, the power infeed from each wind turbine generator of the wind power park may effectively be regulated by the wind turbine generator itself, which typically is not directly controlled by the controller of the first HVDC station. However the grid code for the AC network of the wind power park may effectively define a known transfer function between AC frequency and power infeed, and thus by controlling the AC frequency, the controller of the first HVDC station may indirectly control active power infeed.

Thus, if the controller of the second HVDC station determines a need to reduce active power infeed, it may determine an appropriate target operating frequency for AC power generation system connected to the first HVDC station, e.g. the wind power park, and communicate the target frequency to a controller of the first HVDC station.

However, especially if the first HVDC station is located on an off-shore platform a relatively long way from land, a situation may occur where a dedicated telecommunication link between the first HVDC station and second HVDC station may not available. Wired communication links, e.g. by suitable submarine fibre optic cables or the like, may become damaged and wireless communications can be adversely impacted by weather conditions. It would be desirable for the HVDC power transmission to still be able to provide suitable active power control, even in the absence of a dedicated communications link between the first and second HVDC stations.

Embodiments of the present disclosure relate to methods and apparatus for HVDC power transmission and to frequency control of an AC network connected to an HVDC station.

Thus according to one aspect there is provided a control apparatus for controlling a frequency set-point for a first AC network electrically connected to a first HVDC station to regulate active power. The controller comprises a frequency controller operable, in a first mode of operation, to determine a frequency set-point for the first AC network based on a measured DC voltage at the first HVDC station and a disturbance detector configured to monitor the measured value of DC voltage at the first HVDC station for a predetermined characteristic indicative that a variation in measured DC voltage corresponds to a known modulation applied to the DC voltage by a second HVDC station. In the first mode of operation, the frequency controller is configured to determine the frequency set-point for the first AC network based on the measured value of DC if said predetermined characteristic is detected. If the predetermined characteristic is not detected, the frequency controller is configured to control the frequency set-point for the first AC network to a predetermined default frequency.

The predetermined default frequency may be a defined constant frequency value.

In some examples the disturbance detector is configured to compare a first value based on the present measured value of DC voltage to a second value based on the value of the frequency set-point for the first AC network. The predetermined characteristic may be that the first and second values do not differ by more than a defined amount. In such a case, the disturbance detector may comprise a frequency-to-voltage module configured to receive the present value of the frequency set-point for the first AC network and to determine an estimated DC voltage according to a predetermined frequency-to-voltage transfer characteristic. The frequency-to-voltage transfer characteristic, applied by the frequency-to-voltage module of the disturbance detector, may be an inverse of a predetermined voltage-to-frequency transfer characteristic applied by the frequency controller in the first mode to determine the frequency set-point for the first AC network.

The frequency controller may further be operable in a second mode of operation to receive control data from the second HVDC station via a communication link and to determine the frequency set-point for the first AC network based on said control data. The frequency controller may be configured to operate in the second mode of operation if a communication link with the second HVDC station is available and to operate in the first mode of operation only if a communication link with the second HVDC station is not available.

In some examples, the frequency controller may comprise a frequency interface for limiting the rate of change of the frequency set-point for the first AC network in accordance with one or more defined grid parameters for the first AC network.

The control apparatus may be used as a control apparatus for a variety of application. In some example the frequency set-point for the first AC network may be a frequency set-point for a wind power park.

Aspects also relate to a power transmission system comprising a first HVDC station connected to a first AC network, where the first HVDC station comprises a control apparatus according to any of the variants described herein. The power transmission system may further comprise a second HVDC station connected to a second AC network with the first HVDC station and second HVDC station connected by a DC link. The second HVDC station may comprises an over-frequency controller operable to modulate the DC voltage of the DC link in the event of detection of over-frequency of the second AC network. In some examples the over-frequency controller of the second HVDC station may be configured, in the event of detection of over-frequency of the second AC network, to control a set-point for the DC voltage of the DC link to a value based on the frequency of the second AC network. In the event of detection of over-frequency of the second AC network, the over-frequency controller may be configured to modulate the DC voltage only if a communication link with the first HVDC station is not available, and if a communication link is available, to transmit control data to the control apparatus of the first HVDC station via the communication link. In some implementations the first AC network and first HVDC station may be located offshore.

In a further aspect there is provided a method of controlling a frequency set-point for a first AC network connected to a first HVDC station to regulate active power. The method comprises monitoring a measured value of DC voltage at the first HVDC station for a predetermined characteristic indicative that a variation in measured DC voltage corresponds to a known modulation applied to the DC voltage by a second HVDC station and, if said predetermined characteristic is detected, determining the frequency set-point based on the measured value of DC voltage at the first HVDC station. If the predetermined characteristic is not detected, the method involves controlling the frequency set-point for the first AC network to a predetermined default frequency.

The method may be implemented to provide any one or more of the features described herein with respect to the variants of the control apparatus or the power transmission system.

Unless clearly indicated to the contrary, any of the features described herein may be implemented in combination with any one or more of the other features.

To better explain the various features and advantages of the embodiments of the present disclosure, various embodiments will now be described, by way of example only, with respect to the accompanying drawings, of which:

Figure 1:
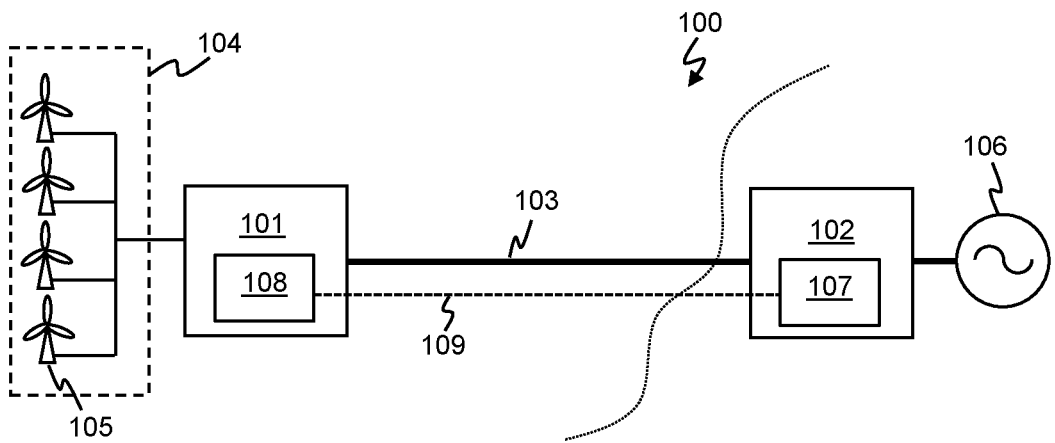
FIG. 1 illustrates an example of an HVDC power transmission system.

FIG. 1 illustrates an example of an HVDC power transmission system 100. A first HVDC station 101 is operable to transmit electrical power to a second HVDC station 102 over a DC link 103. The first HVDC station 101 is connected to a first AC network or grid 104, which in this example is an offshore wind power park which generates AC power from at least one wind turbine 105. The first HVDC station 101 in this example is thus provided on an offshore platform and the DC link 103 comprises at least one power cable suitable for high voltage DC, at least part of which is deployed as a submarine cable.

The second HVDC station, which in this example is located onshore, is coupled to a second AC network or grid 106 which, in this example, may be an AC power distribution grid. As will be understood there may be a variety of loads (not shown) connected to the AC grid 106 and there will typically be other sources of power feeding into the grids, such as fossil fuel burning power stations for example.

Each of the first and second HVDC stations 101 and 102 comprises at least one converter for converting from AC to DC or vice versa. Historically line-commutated converters (LCCs) have been implemented that may use elements such as thyristors. Increasingly however HVDC stations are being implemented using voltage source converters (VSCs) that comprise semiconductor switching elements that can be controllably turned-on and off independently of the line voltage. Various different designs of VSC may be implemented as would be understood by one skilled in the art.

In use the power demands on the AC grid 106, and the power generation feeding into the AC grid 106 may vary over time and various techniques may be used to regulate power and maintain the grid conditions within defined limits.

The second HVDC station 102 may thus be arranged to monitor the conditions of the AC grid 106 and to adapt the active power infeed accordingly. In particular the second HVDC station 102 may be responsive to the AC frequency of the AC grid 106 and in the event that the AC frequency of the AC grid 106 exceeds a certain defined range, e.g. crosses one or more thresholds, a controller 107 of the second HVDC station may operate to take steps so as to reduce the active power infeed.

In typical HVDC power transmission systems, and especially in an example such as illustrated in FIG. 1 where the first HVDC station 101 is connected to an AC generation system 104 such as a wind power park, there may be limited energy storage capability. Thus active power balancing is only possible in coordination with the connected AC system, e.g. the wind power park 104. Each wind turbine generator of the wind power park 104 may control its own power infeed, but generally in accordance with a transfer function based on the operating AC frequency. Typically therefore the operating AC frequency of the wind power park may be increased in order to reduce power delivered to the first HVDC station 101.

Thus, in the event that the controller 107 of the second HVDC station 102 detects an above threshold frequency increase in the connected AC grid 106, it may determine an appropriate AC target operating frequency for the wind power park 104, and transmit the target operating frequency to a controller 108 of the first HVDC station 101. The controller 108 of the first HVDC station 101 receives the target frequency and acts to control the first AC grid of the wind power park 104 accordingly. The target operating frequency may be sent via any suitable dedicated communication channel 109. In some instances there may be a suitable wired communication channel, such as a fibre optic cable or the like, for communication between the first and second HVDC stations 101 and 102, and/or there may be a wireless channel that could be established.

It is possible however that a telecommunications channel between the first and second HVDC stations 101 and 102 may not exist in some circumstances, for instance through failure of some communication equipment or some operating conditions presenting interference.

If no suitable communication link 109 between the first and second HVDC stations 101 and 102 were available, then the HVDC system 100 could simply operate without any active power control for over-frequency events. However, this runs the risk that the HVDC system 100 supplies more active power than desirable to the AC grid 106, which could contribute further to the over-frequency and potentially cause at least part of the AC grid 106 to be disabled, e.g. to trip the AC grid 106.

It would be advantageous for the HVDC system 100 to be able to operate in the absence of a dedicated communication link 109 between the first and second HVDC stations 101 and 102 and provide a suitable frequency for the wind-park AC grid which will leads to the active power being appropriately regulated.

It has been proposed that a DC voltage of the DC link 103 could be used as an indicator or variable so as to communicate information from one HVDC station to the other HVDC station in the absence of a dedicated communication link. Thus, the second HVDC station 102 may control the DC voltage of the DC link 103 and could, in one mode of operation in the absence of a suitable telecommunication link 109, set the DC voltage to provide information to the first HVDC station 101.

Figure 2:
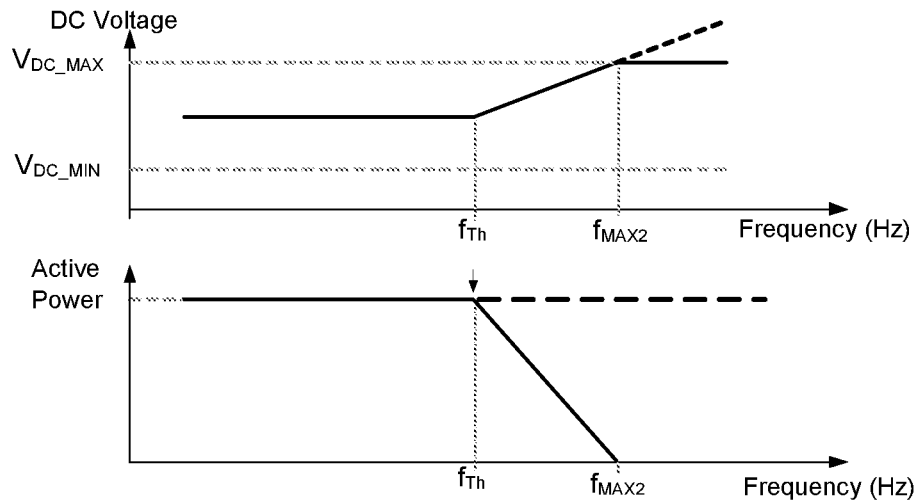
FIG. 2 illustrates the principle of how an HVDC station may set an operating DC voltage set point based on the frequency of a connected AC grid.
Figure 3:
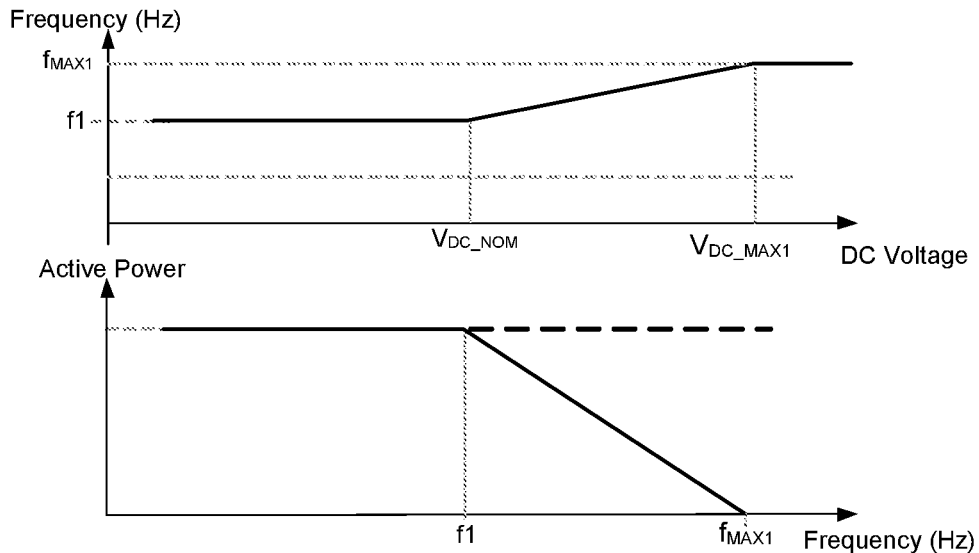
FIG. 3 illustrates the principle of how an HVDC station may control frequency of a connected AC grid based on a DC voltage controlled by another HVDC station.

FIG. 2 illustrates this principle. The top plot of FIG. 2 illustrates how the set-point of the DC voltage ($V_{DC}$) of the second HVDC station, the onshore HVDC station in this example, may vary with frequency of the connected AC grid 106. The DC voltage may be controllable within a set range, $V_{DC\_MIN}$ to $V_{DC\_MAX}$. In normal operating conditions, when the AC frequency of the AC grid 106 is within a defined operating range, the set-point of the DC voltage may be controlled to be equal to a nominal voltage $V_{DC\_NOM}$, which in this example is about midway within the set range. If the AC frequency of the AC grid 106 increases above a set threshold $f_{Th}$ the set-point for the DC voltage may be varied. The set-point for the DC voltage may vary with frequency, above the frequency threshold $f_{Th}$ up to some maximum frequency $f_{MAX}$. In some implementations, if the frequency of the AC grid 106 reaches $f_{MAX}$, the converter of the second HVDC station 102 may be electrically disconnected from the AC grid 106. The DC voltage set-point may vary with AC frequency above the threshold $f_{Th}$ according to any desired transfer characteristic. In the example of FIG. 2 the DC voltage set-point increases linearly with increasing frequency up to the maximum DC value $V_{DC\_MAX}$ at the maximum frequency $f_{MAX}$, which conveniently uses the available voltage range to encode the AC frequency value in a simple way, but other transfer characteristics could be implemented if desired. FIG. 3 illustrates, in the top plot, how a set-point for the AC frequency of the first AC network 104, i.e. the offshore wind power park in this example, may be controlled based on the DC voltage of the DC link in the event that a telecommunication link between the two HVDC stations 101 and 102 is not available. In the event that the DC voltage is at the defined nominal voltage $V_{DC\_NOM}$ the AC frequency of the first AC network, i.e. the wind park 104, may be set to be a desired operating value f1 in line with the relevant grid code and operating conditions. However, in the event that the DC voltage value increases, the AC frequency of operation of the wind power park 104 may be increased. This leads to a consequent reduction in active power infeed, as illustrated in the lower plot of FIG. 3. Thus, as the set point of DC voltage controlled by the second HVDC station 102 is increased above the nominal voltage, as illustrated in the top plot of FIG. 2, the first HVDC station responds with an increased AC operating frequency, which results in a reduced active power infeed at the first HVDC station and consequently the active power at the second HVDC station 102 drops as illustrated in the lower plot of FIG. 2.

In this example the AC frequency of the wind power park 104 is increased linearly with DC voltage up to some maximum frequency $f_{MAX1}$ for the first AC network, i.e. the wind power park 104. Again however other transfer characteristics between DC voltage and frequency of the wind power park, in line with the known transfer characteristic between AC frequency and DC voltage applied by the controller 107 of the second HVDC station.

The controller 107 of the second HVDC station 102 may thus be operable, in the event of over-frequency in the second AC grid 106, to send control data to the controller 108 of the first HVDC station 101 via a suitable telecommunication link if available. The control data comprises data that allows the controller 108 to set an appropriate operating frequency for the first AC network 104. In the event that a suitable communication link is not available, however, the controller 107 of the second HVDC station 102 is additionally operable to control the set point of the DC voltage of the DC link to communicate that an over-frequency event is occurring in the second AC grid 106 and the extent of the over-frequency. The controller 108 of the first HVDC station 101 is operable to receive such control data via the communication link if available or, in the event that there is no communication link, monitor the DC voltage of the DC link to detect a characteristic change indicative of an over-frequency event and, in either case, to adjust the operating frequency of the first AC network 104 accordingly.

Figure 4:
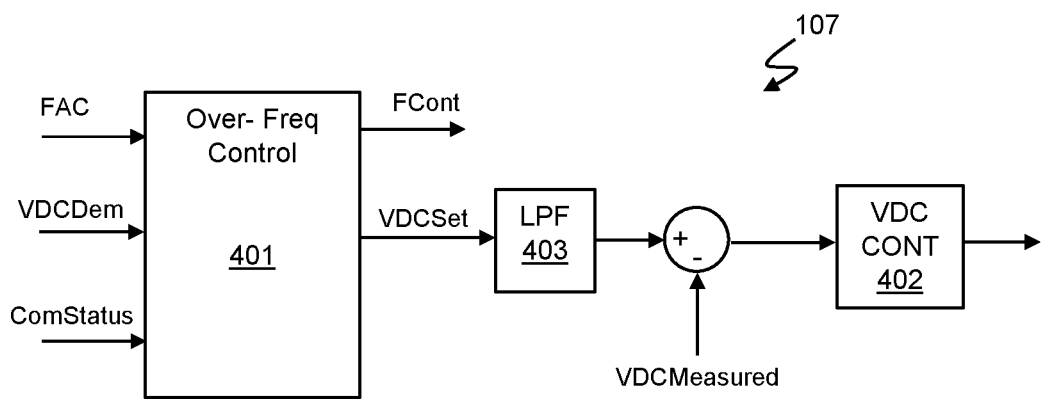
FIG. 4 illustrates one example of a controller operable to signal over-frequency of a connected AC grid by modulating a DC voltage of a DC link.

FIG. 4 illustrates the principles of at least part of the controller 107 of the second HVDC station 102. An over-frequency controller 401 is configured to receive an indication, FAC, of the AC frequency of the AC grid 106 to which the HVDC station 102 is connected. In the example discussed above this is the AC frequency of the onshore AC grid 106 and thus the over-frequency controller 401 will be referred to as the onshore over-frequency controller. The onshore over-frequency controller 401 also receives an indication, VDCDem, of the DC voltage demand, i.e. the required DC voltage for normal operation, e.g. the nominal operating DC voltage. The onshore over-frequency controller 401 further receives a signal, ComStatus, indicating whether a suitable communication link is available with the first HVDC station 101, which could, for example, be a simple binary signal indicating whether a link is available or not.

If the AC frequency of the onshore AC grid 106, as indicated by the frequency signal FAC, remains within an acceptable range, the onshore over-frequency controller 401 may simply pass the required DC voltage demand, VDCDem, as the set point voltage, VDCSet, i.e. the voltage order for the converter of the HVDC station. The difference between the defined voltage set-point, VDCSet, and the presently measured DC voltage may be determined and input to a DC voltage controller 402 to adjust control the converter, e.g. a VSC, of the second HVDC station 102, so as provide the required DC voltage.

However, in the event that the frequency signal FAC indicates that the AC frequency of the onshore AC grid 106 is in an over-frequency condition, e.g. has exceed a defined threshold, the onshore over-frequency controller 401 will act to apply active power control. In this case, if the ComStatus signal indicates that a suitable communication link with the first HVDC station is available, the onshore over-frequency controller will output some frequency control data FCont to be transmitted to the first HVDC station to allow the first HVDC to set an appropriate frequency for the first AC network, e.g. the offshore wind power park 104.

In some instances the control data, Fcont, could be a target operating frequency for the first AC network which is determined by the onshore over-frequency controller 401. The onshore over-frequency controller 401 may determine the target operating frequency for the first AC network based on the present onshore grid frequency (as represented by FAC) according to a predetermined transfer characteristic, based on the known power-versus-frequency characteristics in accordance with the grid codes of the first and second AC grids, e.g. the onshore and offshore grids. In other implementations, however, the control data Fcont could simply be a version of the frequency signal FAC indicating the present frequency of the onshore AC grid 106, or an indication of the extent of the over-frequency, and the controller 108 of the first HVDC station could receive the control data and determine an appropriate frequency for the offshore grid 104 based on the power versus frequency characteristics.

If a communication link is available in an over-frequency situation, the onshore over-frequency controller 401 may thus transmit the relevant control data to the first HVDC station and, in this case the onshore over-frequency controller may continue to pass the received DC voltage demand, VDCDem, as the DC voltage set point for the converter of the onshore HVDC station 102.

If, however, the ComStatus signal indicates that a suitable communication link is not available, the onshore over-frequency 401 controller modulates the received DC voltage demand based on the present value of the AC frequency signal FAC so as to effectively encode the value of the AC frequency in the set-point of the DC voltage as discussed above in relation to FIG. 2.

Figure 5:
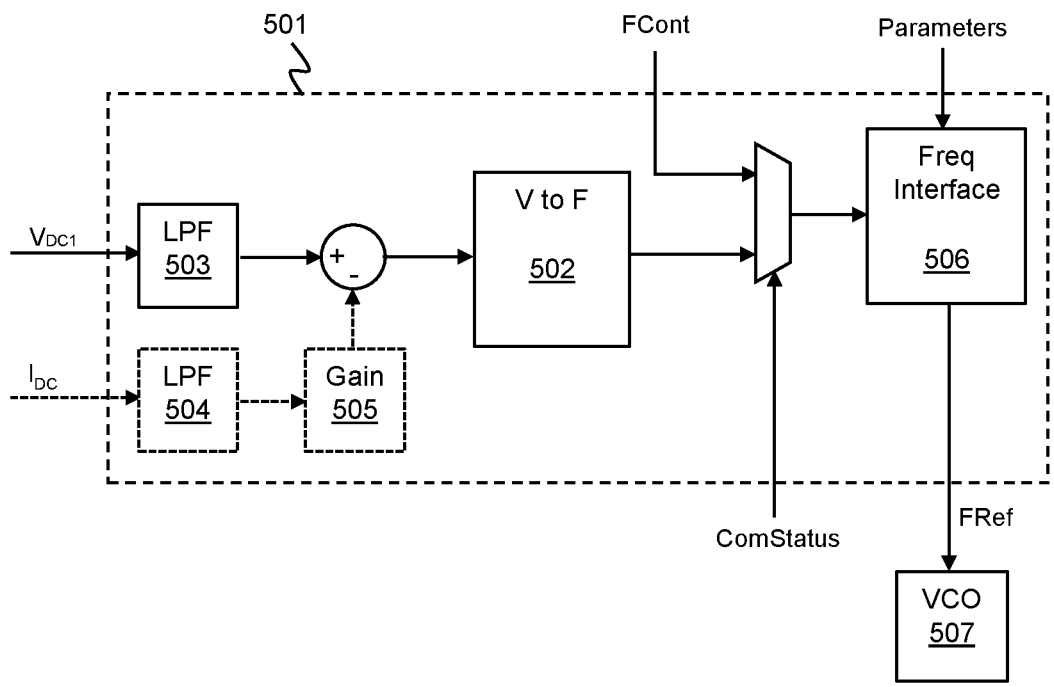
FIG. 5 illustrates one example of a controller operable to monitor a DC voltage of a DC link to detect a modulation indicative of an over-frequency of the AC grid at the far end of the DC link.

FIG. 5 illustrates the principles of at least part of the controller 108 of the first HVDC station 101. A frequency controller 501 is configured to control the frequency of the first AC network in the event of an over-frequency event being detected in the second AC grid. In this example the first AC network comprises the offshore wind power park 104 and thus the frequency controller 501 will be referred to as an offshore frequency controller. The offshore frequency controller 501 is configured to receive any control data, FCont, transmitted from the onshore over-frequency controller 401 via a suitable communication link 109 if available. The offshore frequency controller 501 may thus receive a signal, ComStatus, indicative of whether a suitable communication link is available in a similar manner as discussed above. If the ComStatus signal indicates that a suitable communication link is available, the offshore over-frequency controller 501 may operate in one mode and may act on any received frequency control data FCont. As discussed above in some implementations the control data received may be an indication of the target frequency for operation of the offshore AC network 104, which could thus be used by the offshore frequency controller 501 to define a frequency reference FRef for the offshore AC network.

The offshore frequency controller 501 is also operable in another mode, in the event that a communication link between the first and second HVDC stations is not available, to monitor the DC voltage at the first HVDC station 101 and to control the operating frequency for the offshore AC network based on the monitored DC voltage. In particular the offshore frequency controller 501 is also operable to detect any modulation of the DC voltage indicative of over-frequency of the onshore AC grid 106. A voltage-to-frequency module 502 may thus receive a signal indicative of DC voltage and determine whether the DC voltage has increased so as to indicate an over-frequency event and, if so, to determine an appropriate operating frequency for the offshore AC network 104 in accordance with a predetermined transfer characteristic based on the power-to-frequency characteristics and relevant grid codes.

In some instances, the DC voltage at the first HVDC station 101 may be monitored and the voltage-to-frequency module may apply a transfer characteristic based on the DC voltage as measured at the first HVDC station. In which case, a signal $V_{DC1}$ indicative of the measured DC voltage at the first HVDC station may be received, filtered by low-pass filter 503, and supplied to the voltage-to-frequency module 502. Alternatively, the DC voltage at the second HVDC station could be estimated and the relevant transfer characteristic based on the DC voltage as estimated at the second HVDC station. Thus, for example, an indication of the DC current $I_{DC}$ may also be received and filtered by low-pass filter 504 and supplied to a gain block 505 to be multiplied by some gain factor based on the resistance of the DC link 103 so as provide an indication of any voltage change expected across the DC link, which may be combined with the measured DC voltage at the first HVDC station so as to provide an estimated value of the DC voltage at the second HVDC station 102. In either case the voltage-to-frequency module 502 may determine when the relevant DC voltage experiences a modulation that indicates an over-frequency station in the onshore AC grid and determine and output a suitable target frequency for the offshore AC network 104.

The grid code for the offshore AC grid 104, e.g. the wind power park, may specify certain defined grid parameters, which could be operational parameters, set by the grid operator, such as active and reactive power, grid voltage, rated frequency, phase angle, etc., as would be understood by one skilled in the art. At least some of these defined grid parameters may specify or limit how the frequency of the offshore grid may be varied. For instance there may be one or more rate limits, e.g. a maximum rate at which the frequency may be increased and/or a maximum rate at which the frequency may be decreased. In some instances there could be other parameters such as delay to be applied before certain changes in frequency. The target frequency which is determined, whether based on the control data received FCont or determined by the voltage-to-frequency module, may thus be supplied to a frequency interface 506 that limits the rate of change in frequency according to one or more defined grid parameters that apply for the AC network 104. Thus, if the target frequency changes, the frequency interface 506 will implement the required change in frequency over time in accordance with the defined parameters for the offshore AC network 104. The output from the frequency interface 506 may be a frequency set-point FRef that may be supplied to a voltage controlled oscillator (VCO) 507 to generate an appropriate signal at the required frequency for control of the AC frequency of the AC network, as will be understood by one skilled in the art.

The offshore frequency controller 501 described with reference to FIG. 5 can thus operate in one mode to receive control data from an onshore over-frequency controller when a suitable communication link is available. The offshore frequency controller 501 is also advantageously operable in another mode to provide active power control even in the absence of a suitable communication link by monitoring the DC voltage. If no communication link is available and the DC voltage increases beyond the nominal value, the offshore frequency controller 501 may automatically determine the level of the DC voltage and increase the AC frequency of the offshore AC network. This reduces the active power infeed and thus enables the HVDC system 100 to remain operational but without supplying too much active power to the onshore AC grid 106 in a way that could contribute to the over-frequency.

However a problem can arise in some circumstances in which the DC voltage may be disturbed by some other operating condition. For instance if the AC grid 106 connected to the second HVDC station 102 is unbalanced (but not in an over-frequency situation), this could potentially lead to disturbances of the DC voltage at the second HVDC station away from the nominal DC voltage and could result, for instances, in temporary increases in the DC voltage. As another example it may sometimes be necessary to trigger emergency power control (EPC) in a situation where the onshore AC network is unable to accept power from the wind power park. For EPC a dynamic braking system, e.g. braking chopper arrangement, may be arranged to temporarily absorb the power generated by the wind power park. During an EPC event the DC voltage at the first HVDC station will be disturbed.

If a disturbance of the DC voltage occurs when a communication link between the first and second HVDC stations is not available, the offshore frequency controller 501 may detect the disturbance of the DC voltage and, incorrectly, interpret the change in DC voltage as being a deliberate modulation to signal an over-frequency event. The offshore frequency controller 501 may thus increase the frequency of operation of the first AC network, e.g. the wind power park 104, so as to reduce the active power infeed. Such a reduction in power may be undesirable.

In the situation where the onshore AC grid 106 is disturbed in a way that leads to DC voltage variation, but is not in an over-frequency situation, the reduction in active power infeed may be undesirable and result in power wastage. Even following an EPC event, which may have been triggered due to the onshore grid 106 being temporarily unavailable to receive the generated power, the incorrect activation of power limiting by the offshore frequency controller 105 may be undesirable. As mentioned above the frequency of the first AC network, e.g. offshore wind power park 104, may only be changed in accordance with certain defined grid parameters which may include ramp-up and ramp-down limits. In at least some circumstances the allowed maximum ramp-up rate may be greater, and in some instances much greater, than the allowed ramp down rate. Thus, if the offshore frequency controller 501 acts to increase the AC frequency of the offshore wind power park 104, the frequency may be increased at given rate. However the AC frequency of the offshore wind power park 104 may only ramp down at a much reduced rate, say of the order of few hundred times slower than the maximum ramp up rate. Thus, if the disturbance of the DC voltage causes the offshore frequency controller 501 to increase the AC frequency of the offshore wind power park relatively significantly, the frequency may be increased relatively rapidly but it may take a much longer time for the frequency, and hence the active power infeed, to return to original level. This could therefore lead to a relatively significant degree of wasted power.

In embodiments of the present disclosure the DC voltage is used to signal the existence of an over-frequency situation for the second AC grid 106, but the controller 108 of the first HVDC station has a disturbance detector configured to detect disturbance of the DC voltage. The disturbance detector is configured to discriminate between disturbances of the DC voltage, e.g. rapid and/or temporary variations of the DC voltage and a modulation introduced by the onshore over-frequency controller 401 to signal an over-frequency situation. The disturbance detector monitors the DC voltage for a predetermined characteristic indicative that a variation in measured DC voltage corresponds to a known modulation that may be applied to the DC voltage by a second HVDC station. If a voltage variation is detected, but it does not have the predetermined characteristic that corresponds to a known modulation that may be applied, this can be taken as an indication that the variation of DC voltage is due to a disturbance.

The disturbance detector thus determines whether a change in DC voltage, when a communication link between the first and second HVDC stations, has the characteristics of a modulation used to signal an over-frequency event or has some characteristics that do not apply to such a modulation and hence correspond to a disturbance due to unbalanced or some other faulted operation.

Figure 6:
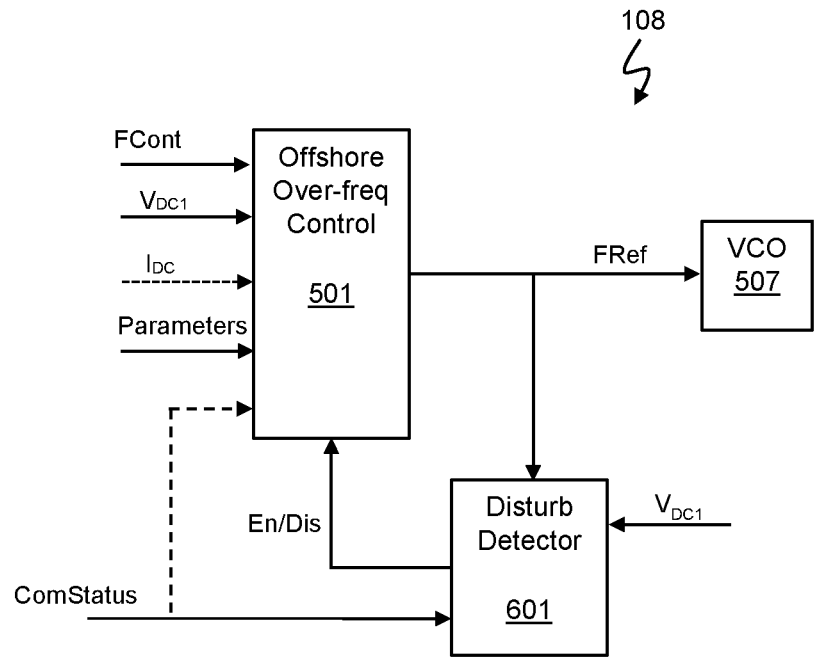
FIG. 6 illustrates a controller operable to monitor a DC voltage of a DC link that includes a disturbance detector according to an embodiment.

FIG. 6 illustrates an example of at least part of controller 108 of the first HVDC station that includes a frequency controller 501 and a disturbance detector 601. The disturbance detector 601, in this example, receives the ComStatus signal indicating whether or not a suitable communication link is available. The disturbance detector 601 also receives the indication $V_{DC1}$ of the DC voltage at the first HVDC station 601 and, as mentioned, determines whether any variation in the DC voltage, when a communication link is not available, is indicative of a deliberate modulation to signal an over-frequency or is instead a result of a disturbance due to unbalanced or some other faulted operation. In some implementations the disturbance detector may monitor a first value, based on the present value of the DC voltage, to detect any significant variation over a relatively rapid timescale, for instance a variation above a threshold amount in a defined time period.

In an embodiment, the disturbance detector may receive the frequency set-point signal FRef from the offshore over frequency controller 501. As noted above the frequency set-point FRef is derived from the measured DC voltage, but the action of the frequency interface 506 in applying the relevant grid parameters, such as ramp rates, means that value of FRef does not change instantaneously. The predetermined characteristic of the known modulation may thus have an upper limit on the rate of change. Thus the value of FRef can be processed together with the signal $V_{DC}$ indicative of the measured DC voltage to detect any significant variations in the DC voltage that do not correspond to the known modulation and hence are characteristic of a disturbance.

Figure 7:
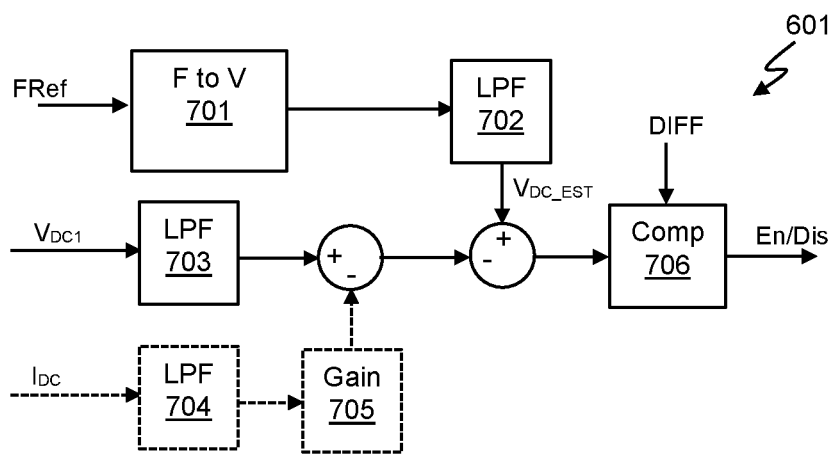
FIG. 7 illustrates one example of a disturbance detector according to an embodiment.

FIG. 7 illustrates one example of a suitable disturbance detector according to an embodiment. The frequency reference signal Fref is supplied to a frequency to voltage module 701. The frequency-to-voltage module 701 applies a predetermined transfer characteristic that determines, for the present value of the frequency set-point, i.e. the value of Fref, an expected value of the DC voltage. In other words the frequency-to-voltage module 701 determines the voltage that, in an over-frequency situation but without any external disturbance of the DC voltage, would be used to signal that the required frequency for the first AC grid was equal to Fref. The frequency-to-voltage module 701 may conveniently apply the inverse transfer function to that applied by the voltage-to-frequency module 502.

The output of the frequency-to-voltage module 701 may, in some implementations, be filtered by low-pass filter 702 to provide an estimated DC voltage value $V_{DC\_EST}$ This estimated value $V_{DC\_EST}$ may then be compared to a DC value based on the presently measured DC voltage to determine whether the two values differ by more than a set amount, e.g. whether the difference between the two values is greater than a defined magnitude.

If the frequency-to-voltage module 701 determines an estimated value for the DC voltage at the first HVDC station, the signal $V_{DC1}$ indicative of the measured DC voltage at the first HVDC station may be filtered, by low pass filter 703 and used for the comparison. If however the frequency-to-voltage module 701 determines an estimated value for the DC voltage at the second HVDC station, the measured DC current $I_{DC}$ may be filtered by low-pass filter and scaled by gain block 705 applying a gain related to the resistance of the DC link and the resultant value combined with the measured DC voltage value $V_{DC1}$ to provide an indication of the DC voltage at the second HVDC station for comparison.

The disturbance detector 601 then determines whether the difference between the voltage value estimated based on the value of FRef and that determined from the measured DC voltage is less than or greater than a defined amount DIFF. In the example illustrated in FIG. 7 the two voltage values are subtracted from one another and the result input to a comparator or quantizer 706 which determines if the magnitude of the difference is greater or smaller than the defined amount, DIFF. If the magnitude of the difference is greater than the defined amount this can be an indication that DC voltage is disturbed in a way that would not be expected by the defined modulation produced by the onshore over-frequency controller. In this case the offshore over-frequency control based on the measured DC voltage value may be disabled, and some default control frequency may be used instead. However, if the difference is smaller than the defined value DIFF, this can indicate that the DC voltage has been deliberately modulated by the onshore over-frequency controller. In some instances the output of the comparator 706 could be used as the control signal for the over-frequency controller, and the En/Dis control signal is used to enable or disable the functionality of over-voltage control based on the DC voltage. The offshore over-voltage controller 701 determined when no communication link is available and in then responsive to this En/Dis control signal as to whether to respond to variations in the DC voltage. In some embodiments however the ComStatus signal could be combined with the output of the comparison so as to provide a signal that enables voltage based over-frequency control when no communication link is available. There are various ways in which suitable control signals could be derived as will be understood by one skilled in the art.

Figure 8:
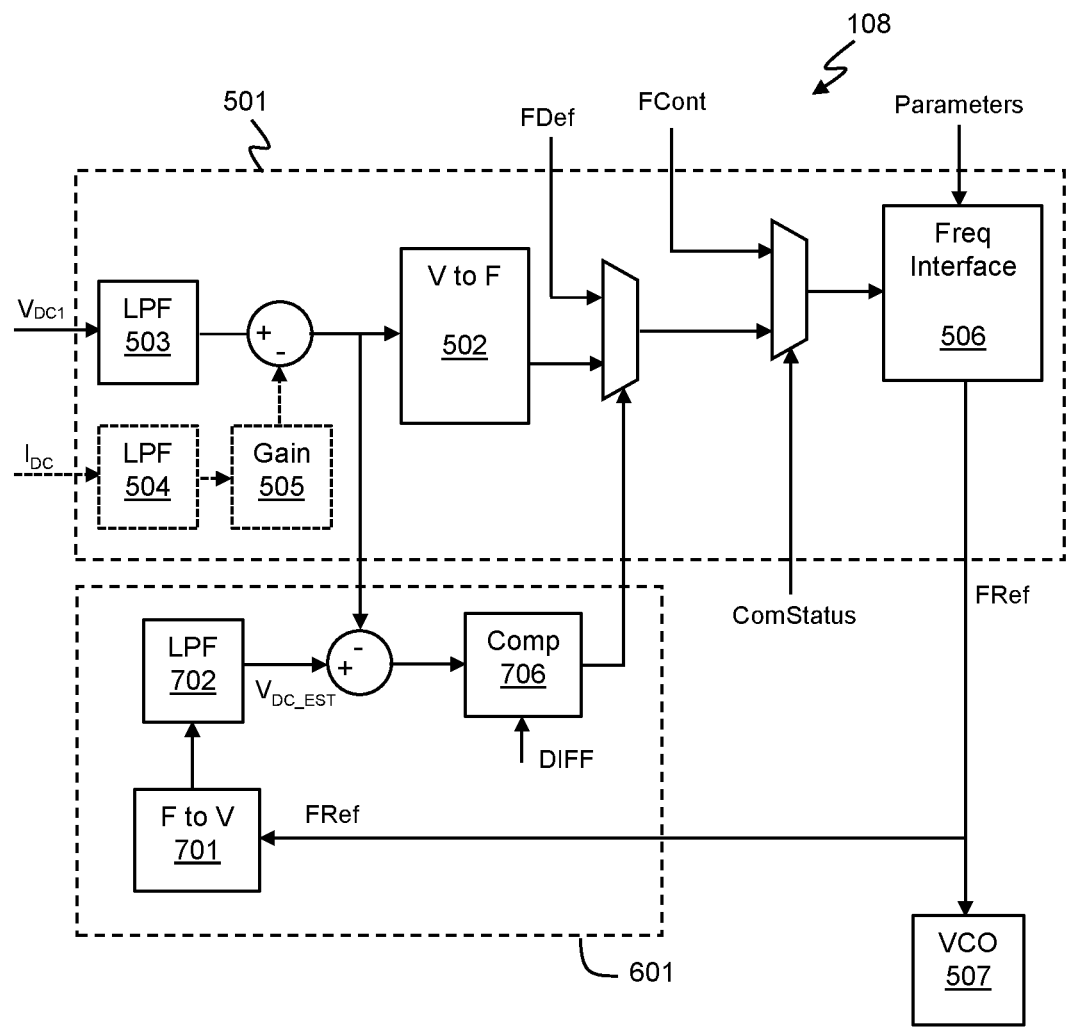
FIG. 8 illustrates another example of a controller that includes a disturbance detector.

FIG. 8 illustrates another example of at least part of a controller 108 of the first HVDC station that includes a frequency controller 501 and a disturbance detector 601. In this example the frequency controller 501 operates in a similar manner as described with reference to FIG. 5, in that, if the ComStatus signal indicates that a suitable telecommunication link is available, then the control data FCont received from the onshore over-frequency controller 401 is provided to the Frequency interface 506. If, however, the ComStatus signal indicates that a suitable telecommunication link is not available, then a derived frequency set point may be used instead. In this example the disturbance detector 601 operates in a similar manner as discussed above and receives the reference frequency signal FRef and determines a corresponding estimated DC voltage value $V_{DC\_EST}$ The disturbance detector 601 determines the difference between the estimated DC voltage value $V_{DC\_EST}$ and a value based on the measured DC voltage (which in this example may be the same value used as the input to voltage-to-frequency module 502) and determines whether the magnitude of difference is greater that a value DIFF. If the difference is less than the relevant value, the output of the voltage-to-frequency module 502 may be used. However, if the difference is greater than the relevant value DIFF, this may indicate that any change of the DC voltage is due to a disturbance. As such a defined default frequency value FDef, which may for instance be the nominal operating frequency or the value of frequency at which the wind power park was previously operating, may be supplied as the frequency set point. In some instances the default frequency value may be a predefined constant frequency value.

It will be understood however that the disturbance detector 601 could be implemented in other ways and in some implementations need not receive the reference frequency signal FRef.

The disturbance detector 601 can thus provide an indication whether a variation of DC voltage, detected at a time when no communication link is available between connected HVDC stations, is due to a deliberate modulation of the DC voltage to signal information about an over-frequency event at the far end of the DC link or is likely due to some other disturbance, e.g. faulted or unbalanced operating conditions. This can thus prevent the offshore over-frequency power controller 501 from incorrectly responding to disturbances of the DC voltage and applying power limiting unnecessarily.

To validate the principles of the embodiments of the present disclosure various simulations were performed based on an offshore wind power project with an HVDC system for power transmission from the offshore wind power park. Simulations were run with and without the functionality of the disturbance detector.

Figure 9A:
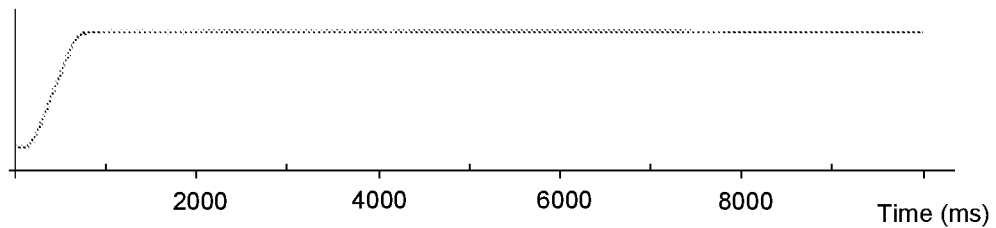
FIGS. 9a to 9d show results from a simulation of an onshore over-frequency event with no communication link.
Figure 9B:
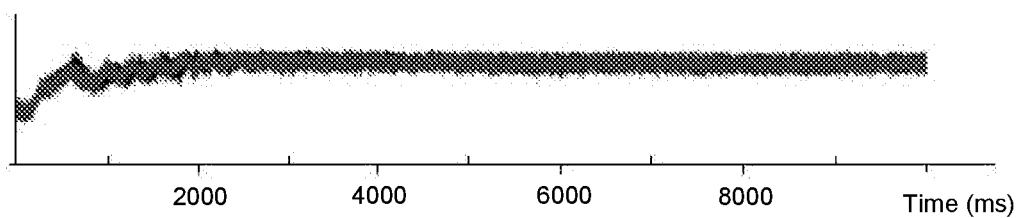
Figure 9C:
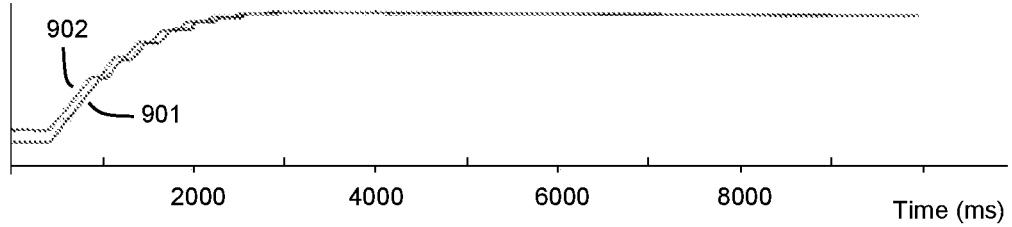
Figure 9D:
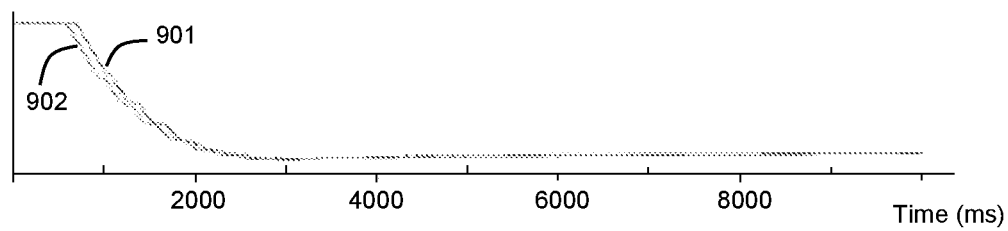

FIGS. 9a to 9d illustrate resultant simulated waveforms for an HVDC power transmission system, such as illustrated in FIG. 1, in the event of over-frequency occurring in the onshore AC grid 106 in the absence of a communication link 109 between the first and second HVDC stations. FIG. 9a illustrates the AC frequency of the simulated onshore AC grid 106. The simulation increased the AC frequency to an over-frequency level and maintained the over-frequency. In response the over-frequency controller 401 of the onshore HVDC station 102 increased the DC voltage set-point as described previously. FIG. 9b shows the resultant DC voltage measured at the offshore HVDC station 101. It can be seen the offset of the DC voltage generally increases. The controller 108 of the offshore HVDC station was simulated with a frequency controller both with, and without, a disturbance detector 601. FIGS. 9c and 9d illustrate respectively the resultant change in the frequency set point of the offshore AC grid, and the resultant active power. In each of FIGS. 9c and 9d the waveforms corresponding to the response with the disturbance detector are labelled 901 and the waveforms corresponding to the response without the disturbance detector are labelled 902. It can be seen that in each case the AC frequency set-point for the offshore wind power part is increased and with consequent reduction in active power. This simulation result thus indicates that the disturbance detector 601 allows the operation of the offshore over-frequency controller 501 in the event of over-frequency in the onshore AC grid.

Figure 10A:
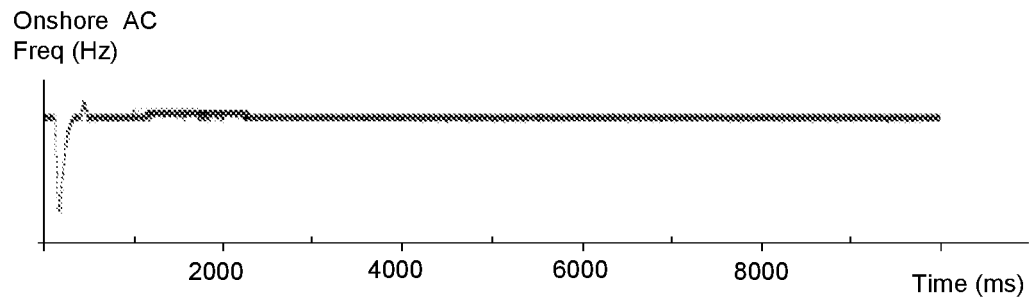
FIGS. 10a to 10d show results from a simulation of an emergency power control (EPC) event with no communication link.
Figure 10B:
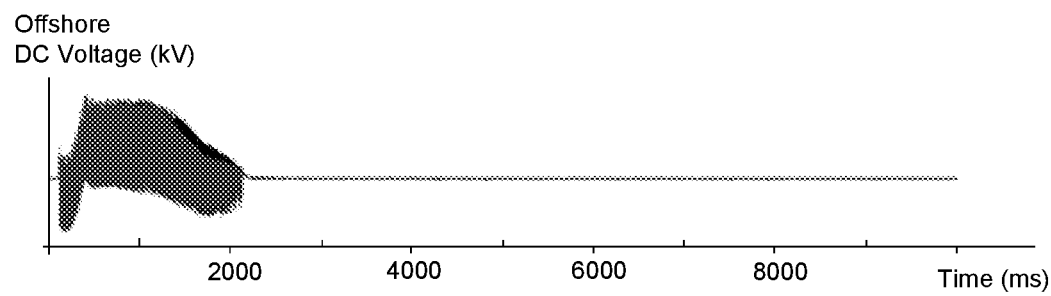
Figure 10C:
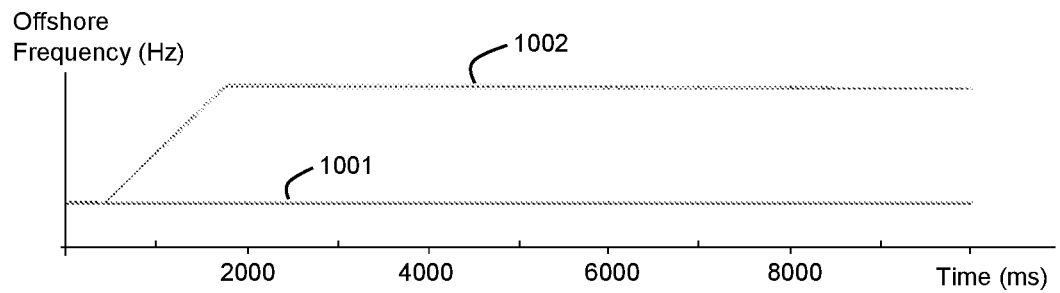
Figure 10D:
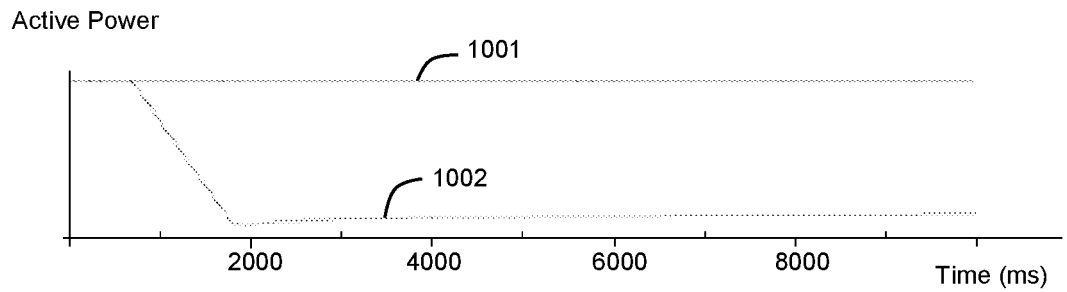

FIGS. 10a to 10d shows similar waveforms as FIGS. 9a to 9d, but show the simulated waveforms during and following an emergency power control (EPC) event, where a dynamic braking chopper may be used to temporarily absorb the power from the wind power park. FIG. 10a illustrates that, other than a possible transient, the frequency of the onshore AC grid is stable. However FIG. 10b shows that EPC event may lead to a significant variation in DC voltage at the offshore HVDC station. FIGS. 10c and 10d again show respectively the offshore AC frequency and active power for a controller with a disturbance detector (labelled as 1001) and without a disturbance detector (labelled as 1002). It can be seen that without the disturbance detector, the offshore frequency controller reacts to the variation in DC voltage and increases the AC frequency, with a consequent reduction in active power and that this power reduction persists after the disturbance of the DC voltage has ceased. In contrast, with the disturbance detector the offshore over-frequency controller correctly keeps the offshore AC frequency at the same level and thus does not suffer from an unnecessary reduction in power.

Embodiments of the present disclosure thus enable an HVDC system to use modulation of the DC voltage to communicate information about an over-frequency event so as to allow for active power control to be applied, even in the absence of a dedicated communication link between the HVDC stations, but avoids disturbances of the DC voltage that do not arise from such deliberate modulations to be detected to avoid falsely applying the power control. Embodiments have been mainly described with reference to a first AC network being an offshore wind power park and a second AC network being an onshore AC grid, however it will appreciated that the first AC network could itself be onshore and in some instances could be some other form of AC power generation network. Likewise the second AC network could extend across at least some bodies of water, e.g. to link islands etc.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A control apparatus for controlling a frequency set-point for a first AC network electrically connected to a first HVDC station to regulate active power, the controller comprising:
a frequency controller operable in a first mode of operation to determine a frequency set-point (FRef) for the first AC network based on a measured value of DC voltage ($V_{DC1}$) at the first HVDC station; and
a disturbance detector configured to monitor the measured value of DC voltage at the first HVDC station ($V_{DC1}$) for a predetermined characteristic indicative that a variation in measured DC voltage corresponds to a known modulation applied to the DC voltage by a second HVDC station;
wherein, in the first mode of operation, the frequency controller is configured to determine the frequency set-point (FRef) for the first AC network based at least in part on the measured value of DC voltage ($V_{DC1}$) if the predetermined characteristic is detected, and to control the frequency set-point (FRef) for the first AC network to a predetermined default frequency if said predetermined characteristic is not detected; and
wherein the disturbance detector is configured to compare a first value based on the present measured value of DC voltage ($V_{DC1}$) to a second value ($V_{DC\_EST}$) based on the value of the frequency set-point (FRef) for the first AC network and said predetermined characteristic is that the first and second values differ by less than a defined amount (DIFF).

2. A control apparatus as claimed in claim 1 wherein the predetermined default frequency is a defined constant frequency value (FDef).

3. A control apparatus as claimed in claim 1 wherein the disturbance detector comprises a frequency-to-voltage module configured to receive the present value of the frequency set-point (FRef) for the first AC network and to determine an estimated DC voltage ($V_{DC\_EST}$) according to a predetermined frequency-to-voltage transfer characteristic.

4. A control apparatus as claimed in claim 3 wherein the frequency-to-voltage transfer characteristic applied by the frequency-to-voltage module of the disturbance detector is an inverse of a predetermined voltage-to-frequency transfer characteristic applied by the frequency controller in the first mode to determine the frequency set-point (FRef) for the first AC network.

5. A control apparatus as claimed in claim 1 wherein the frequency controller is configured to be operable in the first mode of operation if the measured value of DC voltage ($V_{DC1}$) exceeds a defined value.

6. A control apparatus as claimed in claim 1 wherein the frequency controller is further operable in a second mode of operation to receive control data from the second HVDC station via a communication link and to determine the frequency set-point for the first AC network based on said control data.

7. A control apparatus as claimed in claim 6 wherein the frequency controller is configured to operate in the second mode of operation if a communication link with the second HVDC station is available and to operate in the first mode of operation only if a communication link with the second HVDC station is not available.

8. A control apparatus as claimed in claim 1 wherein the frequency controller comprises a frequency interface for limiting the rate of change of the frequency set-point (FRef) for the first AC network in accordance with one or more defined grid parameters for the first AC network.

9. A control apparatus as claimed in claim 1 wherein frequency set-point for the first AC network is a frequency set-point for a wind power park.

10. A power transmission system comprising the control apparatus as claimed in claim 1, the system further comprising:
a second HVDC station connected to a second AC network,
wherein the first HVDC station and second HVDC station are connected by a DC link; and
the second HVDC station comprises an over-frequency controller operable to modulate the DC voltage of the DC link in the event of detection of over-frequency of the second AC network.

11. A power transmission system as claimed in claim 10 wherein the over-frequency controller of the second HVDC station is configured, in the event of detection of over-frequency of the second AC network, to control a set-point for the DC voltage of the DC link to a value based on the frequency of the second AC network.

12. A power transmission system as claimed in claim 10 wherein, in the event of detection of over-frequency of the second AC network, the over-frequency controller is configured to modulate the DC voltage only if a communication link with the first HVDC station is not available, and if a communication link is available, to transmit control data to the control apparatus of the first HVDC station via the communication link.

13. A power transmission system as claimed in claim 10 wherein the first AC network and first HVDC station are located offshore.

14. A method of controlling a frequency set-point (FRef) for a first AC network connected to a first HVDC station to regulate active power, the method comprising:
monitoring a measured value of DC voltage at the first HVDC station ($V_{DC1}$) for a predetermined characteristic indicative that a variation in measured DC voltage corresponds to a known modulation applied to the DC voltage by a second HVDC station;
if the predetermined characteristic is detected, determining the frequency set-point based on the measured value of DC voltage ($V_{DC1}$) at the first HVDC station; and
if the predetermined characteristic is not detected control the frequency set-point (FRef) for the first AC network to a predetermined default frequency; and
comparing a first value based on the present measured value of DC voltage ($V_{DC1}$) to a second value ($V_{DC\_EST}$) based on the value of the frequency set-point (FRef) for the first AC network and said predetermined characteristic is that the first and second values differ by less than a defined amount (DIFF).

* * * * *